United States Patent
Tani (10) Patent No.: US 11,148,558 B2
(45) Date of Patent: Oct. 19, 2021

(54) ILLUMINANCE ADJUSTING APPARATUS, ILLUMINANCE ADJUSTING METHOD, AND COMPUTER PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kentaro Tani, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/772,571

(22) PCT Filed: Nov. 29, 2018

(86) PCT No.: PCT/JP2018/044086
§ 371 (c)(1),
(2) Date: Jun. 12, 2020

(87) PCT Pub. No.: WO2019/116920
PCT Pub. Date: Jun. 20, 2019

(65) Prior Publication Data
US 2020/0398747 A1    Dec. 24, 2020

(30) Foreign Application Priority Data
Dec. 15, 2017 (JP) .............................. JP2017-240812

(51) Int. Cl.
*B60N 2/14* (2006.01)
*H05B 47/11* (2020.01)
(Continued)

(52) U.S. Cl.
CPC ................. *B60N 2/14* (2013.01); *B60Q 3/74* (2017.02); *B60Q 3/80* (2017.02); *H05B 47/105* (2020.01); *H05B 47/11* (2020.01)

(58) Field of Classification Search
CPC . B60Q 3/74; B60Q 3/80; B60Q 3/233; B60Q 2300/22; B60Q 1/12; B60Q 1/1423;
(Continued)

(56) References Cited

U.S. PATENT DOCUMENTS 5,890,779 A    4/1999 Blackburn et al.
2019/0049958 A1*  2/2019 Liu ........................ G01S 17/89

FOREIGN PATENT DOCUMENTS

JP    2006-056440 A    3/2006
JP    2015-134513 A    7/2015
(Continued)

OTHER PUBLICATIONS

International Search Report, Application No. PCT/JP2018/044086, dated Feb. 19, 2019. ISA/Japan Patent Office.

*Primary Examiner* — Henry Luong
(74) *Attorney, Agent, or Firm* — Honigman LLP (57) ABSTRACT

With an illuminance adjusting apparatus, if automatic driving of a vehicle is being performed, a control unit determines whether or not an estimated time that it is estimated to take until the automatic driving ends is less than or equal to a reference time. If it is determined by the control unit that the estimated time is less than or equal to the reference time, a drive unit reduces illuminance of an interior light for illuminating an interior of the vehicle.

7 Claims, 6 Drawing Sheets

(51) Int. Cl.
*B60Q 3/74* (2017.01)
*G05D 1/00* (2006.01)
*B60Q 3/80* (2017.01)
*H05B 47/105* (2020.01)

(58) Field of Classification Search
CPC . H05B 47/11; B60N 2/14; G05D 1/00; G05D 1/0061; G05D 2201/0212; G05D 2201/0213
See application file for complete search history.

(56) References Cited

FOREIGN PATENT DOCUMENTS

| | | | | |
|---|---|---|---|---|
| JP | 2017206200 A | * | 11/2017 | |
| WO | WO-2017158771 A1 | * | 9/2017 | ........... G05D 1/0088 |

\* cited by examiner

| Rotation Angle | | Multiplier Coefficient |
|---|---|---|
| Front Left Seat | Front Right Seat | |
| 0 Degrees | 0 Degrees | Coefficient C1 (=0.2) |
| 180 Degrees | 180 Degrees | Coefficient C2 (=1.0) |
| Multiplier Coefficient | | Coefficient C3 (=0.5) |

ILLUMINANCE ADJUSTING APPARATUS, ILLUMINANCE ADJUSTING METHOD, AND COMPUTER PROGRAM

This application is the U.S. national stage of PCT/JP2018/044086 filed Nov. 29, 2018, which claims priority of Japanese Patent Application No. JP 2017-240812 filed Dec. 15, 2017.

TECHNICAL FIELD

The present disclosure relates to an illuminance adjusting apparatus, an illuminance adjusting method, and a computer program.

BACKGROUND

An illuminance adjusting apparatus (e.g., see JP H11-255017A) for adjusting illuminance of an interior light that illuminates an interior space is mounted in a vehicle. The illuminance adjusting apparatus adjusts the illuminance of the interior light according to an illuminance outside of the vehicle. Accordingly, the brightness of the interior space felt by a vehicle occupant can be kept constant.

Development of a vehicle equipped with a function of performing automatic driving has progressed. In a vehicle that is not equipped with a function of performing automatic driving, the illuminance of an interior light is adjusted so as not to hinder driving of the vehicle performed by a driver. However, when automatic driving of the vehicle is being performed, a computer performs driving, and therefore the illuminance of the interior light can be adjusted without giving consideration to visibility for a person looking outside of the vehicle from the interior. When automatic driving is being performed, the driving performed by the computer is not hindered even when the illuminance of the interior light is high and visibility is low.

However, if automatic driving ends in a state in which the illuminance outside of the vehicle is low and the illuminance of the interior light is high, there is a possibility that the driver will start manual driving in a state in which visibility is low when it is necessary to perform manual driving. It is not preferable that the driver performs manual driving in a state in which visibility is low.

It is an object of the present disclosure to provide an illuminance adjusting apparatus, an illuminance adjusting method, and a computer program according to which it is possible to end automatic driving in a state in which visibility is high.

SUMMARY

An illuminance adjusting apparatus according to an aspect of the present disclosure includes: a determination unit configured to, if automatic driving of a vehicle is being performed, determine whether or not an estimated time that it is estimated to take until the automatic driving ends is less than or equal to a predetermined time; and an adjusting unit configured to reduce illuminance of an interior light for illuminating an interior of the vehicle, if it is determined by the determination unit that the estimated time is less than or equal to the predetermined time.

An illuminance adjusting method according to an aspect of the present disclosure includes: a step of determining, if automatic driving of a vehicle is being performed, whether or not an estimated time that it is estimated to take until the automatic driving ends is less than or equal to a predetermined time; and a step of reducing illuminance of an interior light for illuminating an interior of the vehicle, if it is determined that the estimated time is less than or equal to the predetermined time.

A computer program according to an aspect of the present disclosure causes a computer to execute: a step of determining, if automatic driving of a vehicle is being performed, whether or not an estimated time that it is estimated to take until the automatic driving ends is less than or equal to a predetermined time; and a step of instructing reducing illuminance of an interior light for illuminating an interior of the vehicle, if it is determined that the estimated time is less than or equal to the predetermined time.

Note that not only can the present disclosure be realized as an illuminance adjusting apparatus including this kind of characteristic processing unit, but the present disclosure can also be realized as an illuminance adjusting method in which the characteristic processing is a step, or can be realized as a computer program for causing a computer program to realize the step. Also, the present disclosure can be realized as a semiconductor integrated circuit that realizes part or all of the illuminance adjusting apparatus or can be realized as an illuminance adjusting system including the illuminance adjusting apparatus.

Advantageous Effects of the Present Disclosure

According to the present disclosure, it is possible to end automatic driving in a state in which visibility is high.

DETAILED DESCRIPTION OF PREFERRED EMBODIMENTS

First, embodiments of the present disclosure will be listed and described. At least portions of the embodiments described hereinafter may also be combined as appropriate.

An illuminance adjusting apparatus according to the present aspect includes: a determination unit configured to, if automatic driving of a vehicle is being performed, determine whether or not an estimated time that it is estimated to take until the automatic driving ends is less than or equal to a predetermined time; and an adjusting unit configured to reduce illuminance of an interior light for illuminating an interior of the vehicle, if it is determined by the determination unit that the estimated time is less than or equal to the predetermined time.

In the illuminance adjusting apparatus according to the present aspect, if it is determined by the determination unit that the estimated time is less than or equal to the predetermined time, the adjusting unit reduces the illuminance of the interior light in a stepwise manner.

In the illuminance adjusting apparatus according to the present aspect, a rotatable seat is installed in the vehicle, the illuminance adjusting apparatus includes a rotation angle detection unit configured to detect a rotation angle of the seat, and if the automatic driving is being performed, the adjusting unit adjusts the illuminance of the interior light based on the rotation angle detected by the rotation angle detection unit.

The illuminance adjusting apparatus according to the present aspect includes an illuminance detection unit configured to detect an illuminance outside of the vehicle. If the automatic driving is being performed, the adjusting unit adjusts the illuminance of the interior light based on the rotation angle detected by the rotation angle detection unit and the illuminance detected by the illuminance detection unit.

In the illuminance adjusting apparatus according to the present aspect, the adjusting unit sets an illuminance based on the illuminance detected by the illuminance detection unit, and adjusts the illuminance of the interior light based on the rotation angle detected by the rotation angle detection unit, in a range of being less than or equal to the set illuminance.

An illuminance adjusting method according to the present aspect includes: a step of determining, if automatic driving of a vehicle is being performed, whether or not an estimated time that it is estimated to take until the automatic driving ends is less than or equal to a predetermined time; and a step of reducing illuminance of an interior light for illuminating an interior of the vehicle, if it is determined that the estimated time is less than or equal to the predetermined time.

A computer program according to the present aspect causes a computer to execute: a step of determining, if automatic driving of a vehicle is being performed, whether or not an estimated time that it is estimated to take until the automatic driving ends is less than or equal to a predetermined time; and a step of instructing reducing illuminance of an interior light for illuminating an interior of the vehicle, if it is determined that the estimated time is less than or equal to the predetermined time.

With the illuminance adjusting apparatus, the illuminance adjusting method, and the computer program according to the above-described aspect, if the estimated time that it is estimated to take until automatic driving ends is less than or equal to a predetermined time, the illuminance of the interior light is reduced, and the visibility for a person looking outside of the vehicle from the interior is improved. Accordingly, the automatic driving ends in a state in which the visibility is high.

With the illuminance adjusting apparatus according to the above-described aspect, if the estimated time that it is estimated to take until automatic driving ends is less than or equal to the predetermined time, the illuminance of the interior light is reduced in a stepwise manner. For this reason, the visibility for the person in the interior gradually increases.

With the illuminance adjusting apparatus according to the above-described aspect, when automatic driving is being performed, the illuminance of the interior light is adjusted to a suitable illuminance based on the rotation angle of the seat.

With the illuminance adjusting apparatus according to the above-described aspect, when automatic driving is being performed, the illuminance of the interior light is adjusted to a more suitable illuminance based not only on the rotation angle of the seat, but also on the illuminance outside of the vehicle.

With the illuminance adjusting apparatus according to the above-described aspect, an illuminance is set based on the illuminance outside of the vehicle, and the illuminance of the interior light is adjusted based on the rotation angles of the seats in a range of being less than or equal to the set illuminance.

A specific example of a lighting system according to an embodiment of the present disclosure will be described hereinafter with reference to the drawings. Note that the present disclosure is indicated by the claims rather than being limited to the foregoing examples, and all changes which come within the meaning and range of equivalency of the claims are intended to be encompassed therein.

Figure 1:
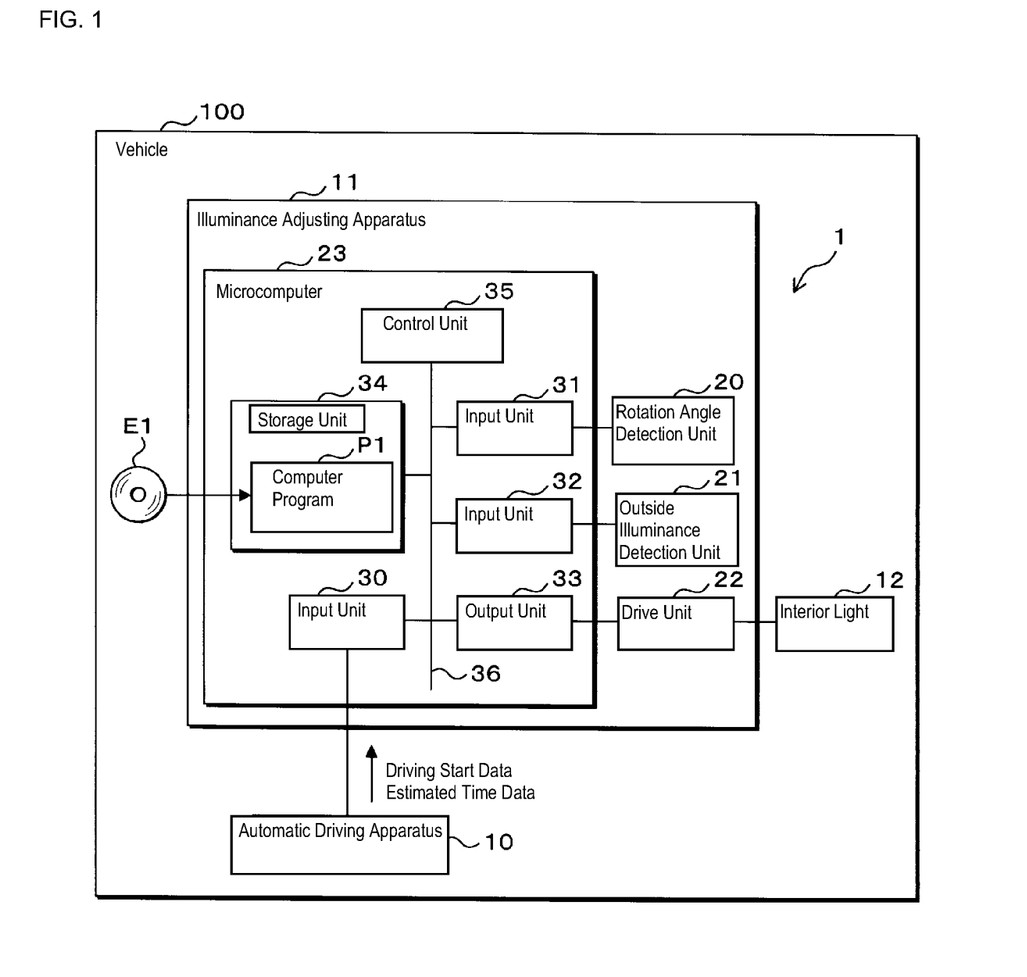
FIG. 1 is a block diagram showing a configuration of a main portion of a lighting system of an embodiment.

FIG. 1 is a block diagram showing a configuration of a main portion of a lighting system 1 of the present embodiment. The lighting system 1 is suitably mounted in a vehicle 100, and includes an automatic driving apparatus 10, an illuminance adjusting apparatus 11, and an interior light 12. The automatic driving apparatus 10 is connected to the illuminance adjusting apparatus 11. The illuminance adjusting apparatus 11 is further connected to the interior light 12.

The automatic driving apparatus 10 receives an automatic driving instruction instructing automatic driving of the vehicle 100 from an occupant of the vehicle 100. When an automatic driving instruction is received, the automatic driving apparatus 10 receives input of a destination from an occupant. When input of a destination is received, the automatic driving apparatus 10 starts automatic driving of the vehicle 100 and outputs driving start data indicating the start of automatic driving to the illuminance adjusting apparatus 11. The automatic driving apparatus 10 performs automatic driving of the vehicle 100 until the vehicle 100 arrives at the destination received from the occupant.

While the automatic driving of the vehicle 100 is being performed, the automatic driving apparatus 10 periodically estimates the time that it will take to arrive at the destination, that is, the time that it will take until the automatic driving ends. Map data indicating a map is stored in the automatic driving apparatus 10. Furthermore, a vehicle speed sensor that detects the speed of the vehicle 100 is connected to the automatic driving apparatus 10. The automatic driving apparatus 10 estimates the time that it will take until the automatic driving ends based on, for example, the travel distance from the current location to the destination and the speed of the vehicle 100. Each time the automatic driving apparatus 10 estimates the time that it will take until the automatic driving ends, the automatic driving apparatus 10 outputs estimated time data indicating the estimated time, that is, the estimated time that it is estimated to take until the automatic driving ends, to the illuminance adjusting apparatus 11.

When the vehicle 100 arrives at the destination, the automatic driving apparatus 10 ends the automatic driving, and stops operation until an automatic driving instruction is once again received from an occupant. When the automatic driving apparatus 10 has stopped operation, the driver performs manual driving of the vehicle 100 by operating a steering wheel, an accelerator pedal, a brake pedal, and the like.

The interior light 12 is a lamp, an LED (Light Emitting Diode), or the like, and illuminates the interior of the vehicle 100. The illuminance adjusting apparatus 11 adjusts the illuminances of the interior light 12. The illuminance adjusting apparatus 11 starts processing for adjusting the illuminance of the interior light 12 when input of driving start data is received from the automatic driving apparatus 10. The illuminance adjusting apparatus 11 adjusts the illuminance of the interior light 12 based on the estimated time indicated by the estimated time data.

The illuminance adjusting apparatus 11 turns off the interior light 12 by adjusting the illuminance of the interior light 12 to 0 lux, and turns on the interior light 12 by adjusting the illuminance of the interior light 12 to a value exceeding 0 lux.

The illuminance adjusting apparatus 11 includes a rotation angle detection unit 20, an outside illuminance detection unit 21, a drive unit 22, and a microcomputer 23. The microcomputer 23 includes input units 30, 31, and 32, an output unit 33, a storage unit 34, and a control unit 35. The automatic driving apparatus 10, the rotation angle detection unit 20, and the outside illuminance detection unit 21 are respectively connected to the input units 30, 31, and 32. The interior light 12 is connected to the drive unit 22. The drive unit 22 is further connected to the output unit 33. In the microcomputer 23, the input units 30, 31, and 32, the output unit 33, the storage unit 34, and the control unit 35 are connected to an internal bus 36.

Driving start data is input to the input unit 30 of the microcomputer 23 from the automatic driving apparatus 10. When the driving start data is input, the input unit 30 notifies the control unit 35 that the driving start data has been input. While the automatic driving apparatus 10 is performing automatic driving, the estimated time data is periodically input to the input unit 30 from the automatic driving apparatus 10. The control unit 35 acquires the estimated time data from the input unit 30.

Figure 2:
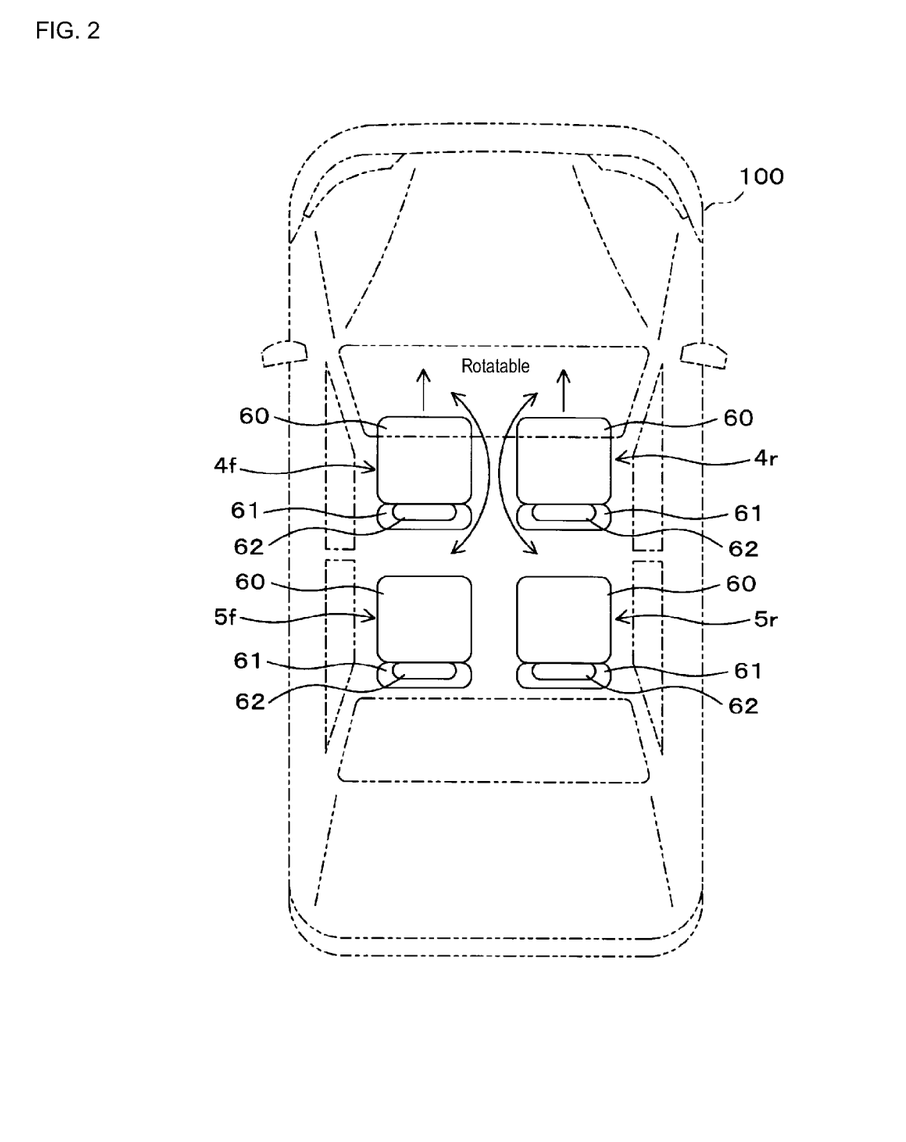
FIG. 2 is a diagram illustrating an interior of a vehicle.

FIG. 2 is a diagram illustrating an interior of the vehicle 100. As shown in FIG. 2, a front-left seat 4f is installed on the left side of the front portion the vehicle 100, and a front-right seat 4r is installed on the right side of the front portion of the vehicle 100. Furthermore, in the interior of the vehicle 100, a rear-left seat 5f is installed on the left side of the rear portion of the vehicle 100, and a rear-right seat 5r is installed on the right side of the rear portion of the vehicle 100. The interior light 12 is installed, for example, above the central portion of the interior of the vehicle 100, and illuminates the interior of the vehicle 100. In FIG. 2, illustration of the interior light 12 is omitted.

A cuboid-shaped bottom portion 60 is installed on the floor of the interior in the front-left seat 4f. The lower surface of the bottom portion 60 opposes the floor surface of the interior. A backrest 61 is installed on one side surface of the bottom portion 60. The backrest 61 extends upward with respect to the bottom portion 60 along the side surface. A headrest 62 is installed on the upper surface of the backrest 61. An occupant sits on the bottom portion 60, leans against the backrest 61, and rests his or her head on the headrest 62.

The front-left seat 4r, the rear-left seat 5f, and the rear-right seat 5r each have a bottom portion 60, a backrest 61, and a headrest 62, similarly to the front-left seat 4f. The configurations of the front-right seat 4r, the rear-left seat 5f, and the rear-right seat 5r are similar to the configuration of the front-left seat 4f.

Hereinafter, with respect to the front-left seat 4f, the front-right seat 4r, the rear-left seat 5f, and the rear-right seat 5r, the direction from the one side surface of the bottom surface 60 on which the backrest 61 is arranged to the one side surface of the bottom portion 60 opposing that side surface is referred to as a "seat direction". In the example shown in FIG. 2, the seat directions of the front-left seat 4f, the front-right seat 4r, the rear-left seat 5f, and the rear-right seat 5r are the frontward direction of the vehicle 100.

The bottom portions 60 of the front-left seat 4f and the front-right seat 4r are installed so as to be able to rotate. Occupants can adjust the rotation angles of the front-left seat 4f and the front-right seat 4r by operating an operation portion (not shown).

The occupant can adjust the seat direction of the front-left seat 4f to be frontward, obliquely frontward-right, rightward, obliquely rearward-right, and rearward by rotating the front-left seat 4f. The rotation angle detection unit 20 shown in FIG. 1 detects the angle formed by the seat direction and the frontward direction of the vehicle 100 as the rotation angle for the front-left seat 4f. If the rotation angle is 0 degrees, the seat direction is the frontward direction. If the rotation angle is 90 degrees, the seat direction is the rightward direction. If the rotation angle is 180 degrees, the seat direction is the rearward direction.

Similarly, the occupant can adjust the seat direction of the front-right seat 4r to forward, obliquely forward-left, leftward, obliquely rearward-left, and rearward by rotating the front-right seat 4r. The rotation angle detection unit 20 shown in FIG. 1 detects the angle formed by the seat direction and the frontward direction of the vehicle 100 as the rotation angle for the front-right seat 4r. If the rotation angle is 0 degrees, the seat direction is the frontward direction. If the rotation angle is 90 degrees, the seat direction is the leftward direction. If the rotation angle is 180 degrees, the seat direction is the rearward direction.

The configuration in which the front-left seat 4f and the front-right seat 4r are rotated may also be a configuration in which two motors (not shown) rotate the front-left seat 4f and the front-right seat 4r. In this case, the rotation angle detection unit 20 detects the rotation angles of the front-left seat 4f and the front-right seat 4r based on the number of rotations of each of the two motors, for example.

Also, in the interior of the vehicle 100, a camera (not shown) that captures an image of the front-left seat 4f and the front-right sear 4r may also be installed. In this case, the rotation angle detection unit 20 may also detect the rotation angles of the front-left seat 4f and the front-right seat 4r based on the image captured by the camera.

The rear-left seat 5f and the rear-right seat 5r do not rotate, and the seat directions of the rear-left seat 5f and the rear-right seat 5r are fixed to the frontward direction of the vehicle 100.

The rotation angle detection unit 20 periodically detects the rotation angles of the front-left seat 4f and the front-right seat 4r. Each time the rotation angle detection unit 20 detects a rotation angle, the rotation angle detection unit 20 outputs rotation angle data indicating the detected rotation angle to the input unit 31 of the microcomputer 23. The control unit 35 acquires the rotation angle data from the input unit 31.

The outside illuminance detection unit 21 periodically detects an outside illuminance, which is the illuminance outside of the vehicle 100. Each time the outside illuminance detection unit 21 detects the outside illuminance, the outside illuminance detection unit outputs outside illuminance data indicating the detected outside illuminance to the input unit 32. The control unit 35 acquires the outside illuminance data from the input unit 32.

The storage unit 34 is a non-volatile memory. With respect to the interior light 12, target illuminance data indicating a target illuminance that is to be adjusted to is stored in the storage unit 34. The control unit 35 changes the target illuminance indicated by the target illuminance data stored in the storage unit 34.

The output unit 33 reads out the target illuminance data from the storage unit 34 in accordance with an instruction from the control unit 35, and outputs the read-out target illuminance data to the drive unit 22. If input of the target illuminance data is received from the output unit 33, the drive unit 22 adjusts the illuminance of the interior light 12 to the target illuminance indicated by the input target illuminance data.

The drive unit 22 turns off the interior light 12 by adjusting the illuminance of the interior light 12 to 0 lux, and turns on the interior light 12 by adjusting the illuminance of the interior light 12 to a value exceeding 0 lux.

The drive unit 22 supplies electrical power to the interior light 12. The drive unit 22 adjusts the illuminance of the interior light 12 by adjusting, for example, the voltage value of a voltage applied to the interior light 12 or the current value of a current supplied to the interior light 12.

In addition to the target illuminance data, values of flags are stored in the storage unit 34. The values of the flags are changed to 0 or 1 by the control unit 35.

A computer program P1 is further stored in the storage unit 34. The control unit 35 includes one or multiple CPUs (Central Processing Units). The one or multiple CPUs included in the control unit 35 execute flag changing processing, first adjustment processing, and second adjustment processing by executing the computer program P1. The flag changing processing is processing for changing the value of a flag. The first adjustment processing and the second adjustment processing are processing for adjusting the illuminance of the interior light 12. The computer program P1 is used to cause the one or multiple CPUs included in the control unit 35 to execute the flag changing processing, the first adjustment processing, and the second adjustment processing.

Note that the computer program P1 may also be stored in a storage medium E1 so as to be readable by the one or multiple CPUs included in the control unit 35. In this case, the computer program P1 read out from the storage medium E1 by a reading apparatus (not shown) is stored in the storage unit 34. The storage medium E1 is an optical disk, a flexible disk, a magnetic disk, a magneto-optical disk, a semiconductor memory, or the like. An optical disk is a CD (Compact Disc)-ROM (Read Only Memory), a DVD (Digital Versatile Disc)-ROM, a BD (Blu-Ray (registered trademark)) Disc), or the like. A magnetic disk is, for example, a hard disk. The computer program P1 may also be downloaded from an external apparatus (not shown) connected to a communication network (not shown), and the downloaded program P1 may be stored in the storage unit 34.

The control unit 35 executes the flag changing processing when driving start data is input from the automatic driving apparatus 10 to the input unit 30. In the flag changing processing, the control unit 35 changes the value of a flag stored in the storage unit 34 to 1 and ends the flag changing processing. The control unit 35 changes the value of the flag to 0 if it is determined that the estimated time indicated by the estimated time data input from the automatic driving apparatus 10 to the input unit 30 is less than or equal to a reference time in the second adjustment processing.

As described above, the estimated time indicated by the estimated time data is the time that it is estimated to take until automatic driving ends. Accordingly, the value of the flag is set to 1 in the period from when automatic driving is started to a time obtained by tracing back from the time at which automatic driving is estimated to end by the reference time. In periods other than this period, the value of the flag is set to 0.

Figure 3:
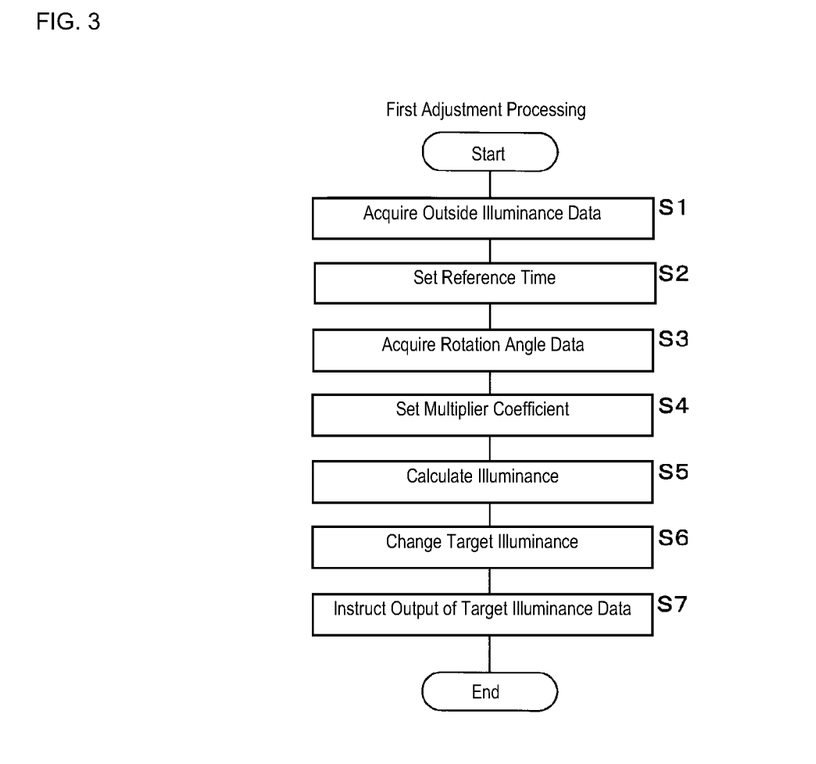
FIG. 3 is a flowchart showing a procedure of first adjustment processing.

FIG. 3 is a flowchart showing a procedure of first adjustment processing. The control unit 35 periodically executes first adjustment processing while the value of the flag is 1. In the first adjustment processing, the control unit 35 acquires outside illuminance data indicating the outside illuminance detected by the outside illuminance detection unit 21 from the input unit 32 (step S1), and sets the reference illuminance based on the outside illuminance indicated by the acquired outside illuminance data (step S2).

Figure 4:
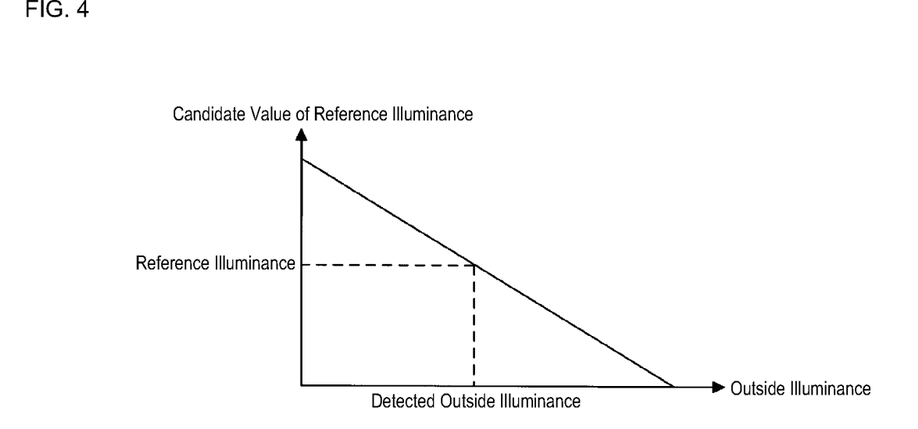
FIG. 4 is a graph showing a relationship between an outside illuminance and a candidate value for a reference illuminance.

FIG. 4 is a graph showing a relationship between the outside illuminance and candidate values for the reference illuminance. The outside illuminances and the candidate values for the reference illuminance are indicated on the horizontal axis and the vertical axis respectively. The relationship between the outside illuminance and the candidate values of the reference illuminance is stored in the storage unit 34. As shown in FIG. 4, the candidate value of the reference illuminance is higher the lower the outside illuminance is, and is lower the higher the outside illuminance is.

In step S2, the control unit 35 sets the candidate value of the reference illuminance corresponding to the outside illuminance indicated by the outside illuminance data acquired in step S1, that is, the reference illuminance corresponding to the outside illuminance detected by the outside illuminance detection unit 21, to the reference illuminance.

Note that in FIG. 4, if the outside illuminance increases, the candidate value of the reference illuminance decreases linearly. However, if the outside illuminance increases, the candidate value of the reference illuminance may also decrease curvilinearly.

Also, in step S2, the control unit 35 may also set the reference illuminance based on a correspondence table in which the candidate values of the reference illuminance are stored in association with outside illuminances. In this case, in the correspondence table, the control unit 35 sets the candidate value of the reference illuminance corresponding to the outside illuminance detected by the outside illuminance detection unit 21 to the reference illuminance. In step S2, the control unit 35 may also set the reference illuminance using a formula in which the outside illuminance and the candidate value of the reference illuminance are variables. In this case, the control unit 35 sets the candidate value of the reference illuminance calculated by substituting the outside illuminance detected by the outside illuminance detection unit 21 into the formula as the reference illuminance.

After executing step S2, the control unit 35 acquires the rotation angle data indicating the rotation angles of the front-left seat 4f and the front-right seat 4r detected by the rotation angle detection unit 20 from the input unit 31 (step S3). Next, based on the rotation angles indicated by the rotation angle data acquired in step S3, the control unit 35 sets a multiplier coefficient by which to multiply the reference illuminance set in step S2 (step S4).

Figure 5:
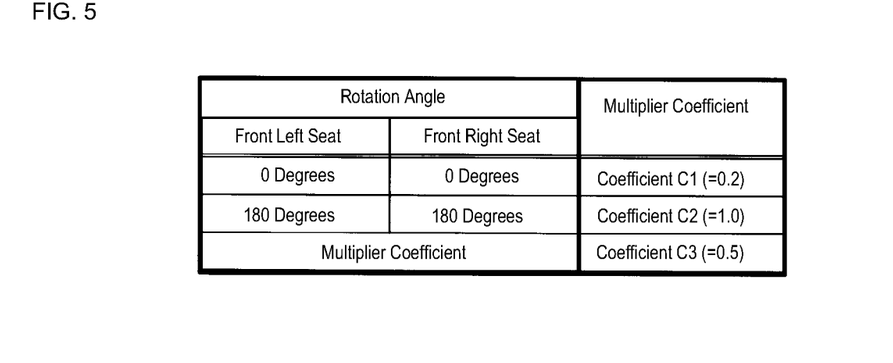
FIG. 5 is a table showing a relationship between rotation angles of a front-left seat and a front-right seat and a multiplier coefficient.

FIG. 5 is a table showing a relationship between the rotation angles of the front-left seat 4f and the front-right seat 4r and the multiplier coefficient. As shown in FIG. 5, coefficients C1, C2, and C3 are stored in association with the rotation angles of the front-left seat 4f and the front-right seat 4r in the storage unit 34. In step S4, as shown in FIG. 5, the control unit 35 sets the multiplier coefficient to the coefficient C1 if the rotation angles of the front-left seat 4f and the front-right seat 4r are 0 degrees. If the rotation angles of the front-left seat 4f and the front-right seat 4r are 180 degrees, the control unit 35 sets the multiplier coefficient to the coefficient C2.

The control unit 35 sets the multiplier coefficient to the coefficient C3 if at least one of the rotation angles of the front-left seat 4f and the front-right seat 4r exceeds 0 degrees and is less than 180 degrees. The coefficient C1 is the smallest, and is, for example, 0.2. The coefficient C2 is the largest, and is, for example, 1.0. The coefficient C3 is a value that exceeds the coefficient C1 and is less than the coefficient C2, and is, for example, 0.5.

Next, the control unit 35 calculates the illuminance by multiplying the reference illuminance set in step S2 by the multiplier coefficient set in step S4 (step S5). Next, the control unit 35 changes the target illuminance indicated by the target illuminance data stored in the storage unit 34 to the illuminance calculated in step S5 (step S6). Thereafter, the control unit 35 instructs the output unit 33 to output the target illuminance data (step S7). Accordingly, the output unit 33 reads out the target illuminance data from the storage unit 34 and outputs the read-out target illuminance data to the drive unit 22. The drive unit 22 adjusts the illuminance of the interior light 12 to the target illuminance indicated by the target illuminance data, that is, the illuminance calculated in step S5. After step S7 is executed, the control unit 35 ends the first adjustment processing.

Instructing the output unit 33 to output the target illuminance data corresponds to instructing the drive unit 22 to adjust the illuminance of the interior light 12 to the target illuminance indicated by the target illuminance data.

If the value of the flag is 1, that is, if automatic driving of the vehicle 100 is being performed, it is assumed that the rotation angles of the front-left seat 4f and the front-right seat 4r are 0 degrees. In this case, the control unit 35 sets the multiplier coefficient to the coefficient C1 in the first adjustment processing. As described above, the coefficient C1 is lower than the coefficients C2 and C3. Accordingly, the control unit 35 changes the target illuminance to a low illuminance, and the drive unit 22 adjusts the illuminance of the interior light 12 to the low illuminance. A situation in which multiple occupants riding in the vehicle 100 are individually spending time in their seats is conceivable as an example of a situation in which the rotation angles of the front-left seat 4f and the front-right seat 4r are 0 degrees.

Figure 6:
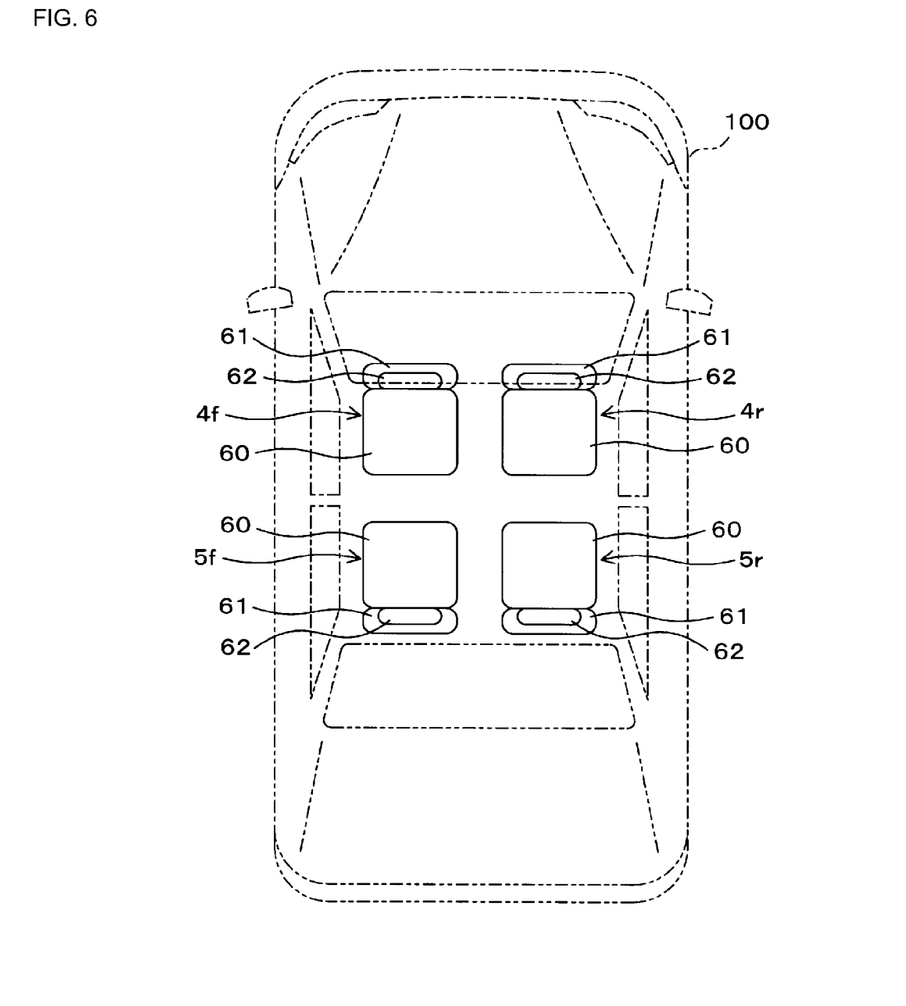
FIG. 6 is a schematic diagram showing an example of a state of the front-left seat and the front-right seat.

FIG. 6 is a schematic diagram showing an example of a state of the front-left seat 4f and the front-right seat 4r. If the value of the flag is 1, as shown in FIG. 6, the rotation angles of the front-left seat 4f and the front-right seat 4r are 180 degrees. In this case, the seat directions of the front-left seat 4f and the rear-left seat 5f are facing each other, and the seat directions of the front-right seat 4r and the rear-right seat 5r are also facing each other.

If the rotation angles of the front-left seat 4f and the front-right seat 4r are 180 degrees, the control unit 35 sets the multiplier coefficient to the coefficient C2 in the first adjustment processing. As described above, the coefficient C2 is higher than the coefficients C1 and C3. Accordingly, the control unit 35 changes the target illuminance to a high illuminance, and the drive unit 22 adjusts the illuminance of the interior light 12 to the high illuminance. A situation in which multiple occupants of the vehicle 100 are facing each other and having a conversation is conceivable as a situation in which the rotation angles of the front-left seat 4f and the front-right seat 4r are 180 degrees.

Figure 7:
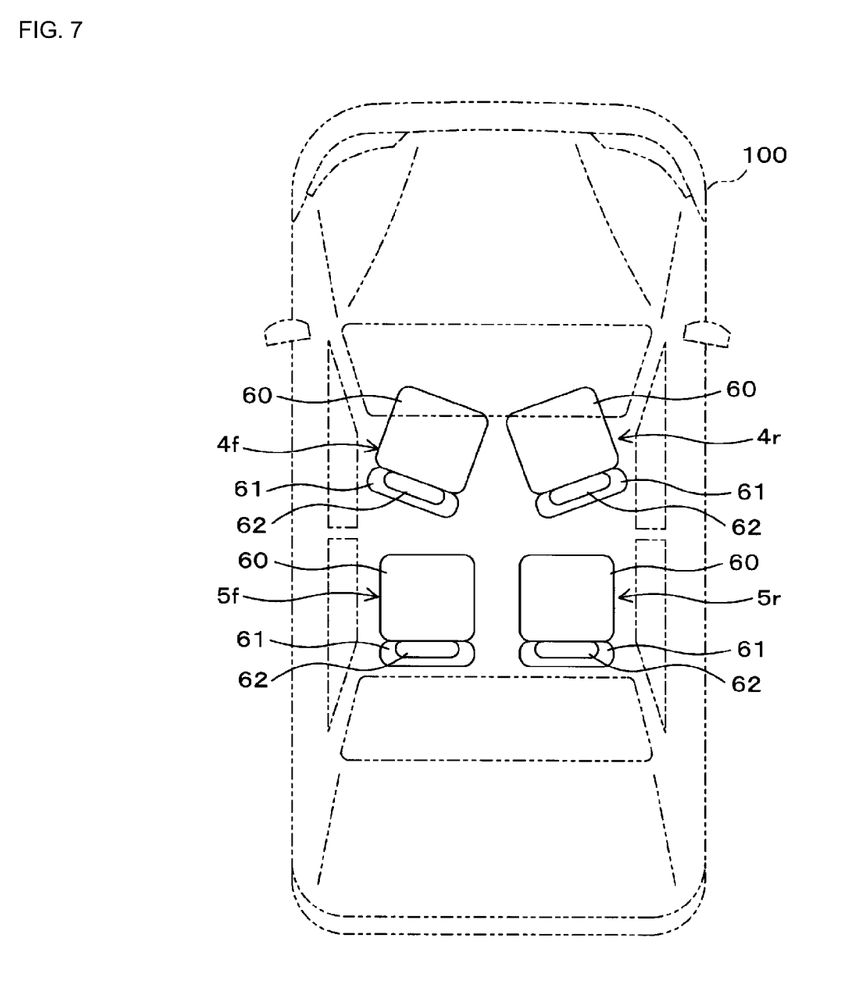
FIG. 7 is a schematic diagram showing another example of a state of the front-left seat and the front-right seat.

FIG. 7 is a schematic diagram showing another example of a state of the front-left seat 4f and the front-right seat 4r. If the value of the flag is 1, as shown in FIG. 7, it is assumed that at least one of the rotation angles of the front-left seat 4f and the front-right seat 4r exceeds 0 degrees and is less than 180 degrees. In the example shown in FIG. 7, the seat direction of the front-left seat 4f has been adjusted to the oblique frontward-right direction of the vehicle 100, and the seat direction of the front-right seat 4r has been adjusted to the oblique forward-left direction of the vehicle 100.

If at least one of the rotation angles of the front-left seat 4f and the front-right seat 4r exceeds 0 degrees and is less than 180 degrees, the control unit 35 sets the multiplier coefficient to the coefficient C3 in the first adjustment processing. As described above, the coefficient C3 exceeds the coefficient C1 and is less than the coefficient C2. Accordingly, the control unit 35 changes the target illuminance to an intermediate-level illuminance and the drive unit 22 adjusts the illuminance of the interior light 12 to the intermediate-level illuminance. A situation in which an occupant sitting in the front-right seat 4r occasionally converses with an occupant sitting in the front-left seat 4f or the rear-left seat 5f is conceivable as an example of a situation in which at least one of the rotation angles of the front-left seat 4f and the front-right seat 4r exceeds 0 degrees and is less than 180 degrees.

As described above, if the automatic driving apparatus 10 is performing automatic driving of the vehicle 100, the drive unit 22 and the control unit 35 adjust the illuminance of the interior light 12 based on the rotation angles of the front-left seat 4f and the front-right seat 4r detected by the rotation angle detection unit 20. The drive unit 22 and the control unit 35 function as an adjustment unit.

As described before, in the first adjustment processing, the target illuminance is changed to the illuminance calculated by multiplying the reference illuminance by the multiplier coefficient. The control unit 35 adjusts the reference illuminance to a higher illuminance the higher the outside illuminance detected by the outside illuminance detection unit 21 is. For this reason, if automatic driving of the vehicle 100 is being performed, the drive unit 22 and the control unit 35 adjust the illuminance of the interior light 12 based not only on the rotation angles of the front-left seat 4f and the front-right seat 4r detected by the rotation angle detection unit 20, but also on the illuminance outside of the vehicle 100 detected by the outside illuminance detection unit 21.

The multiplier coefficient is 0 or more and 1 or less. For this reason, the drive unit 22 and the control unit 35 adjust the illuminance of the interior light 12 based on the rotation angles of the front-left seat 4f and the front-right seat 4r in a range of being less than or equal to the reference illuminance set based on the outside illuminance.

Figure 8:
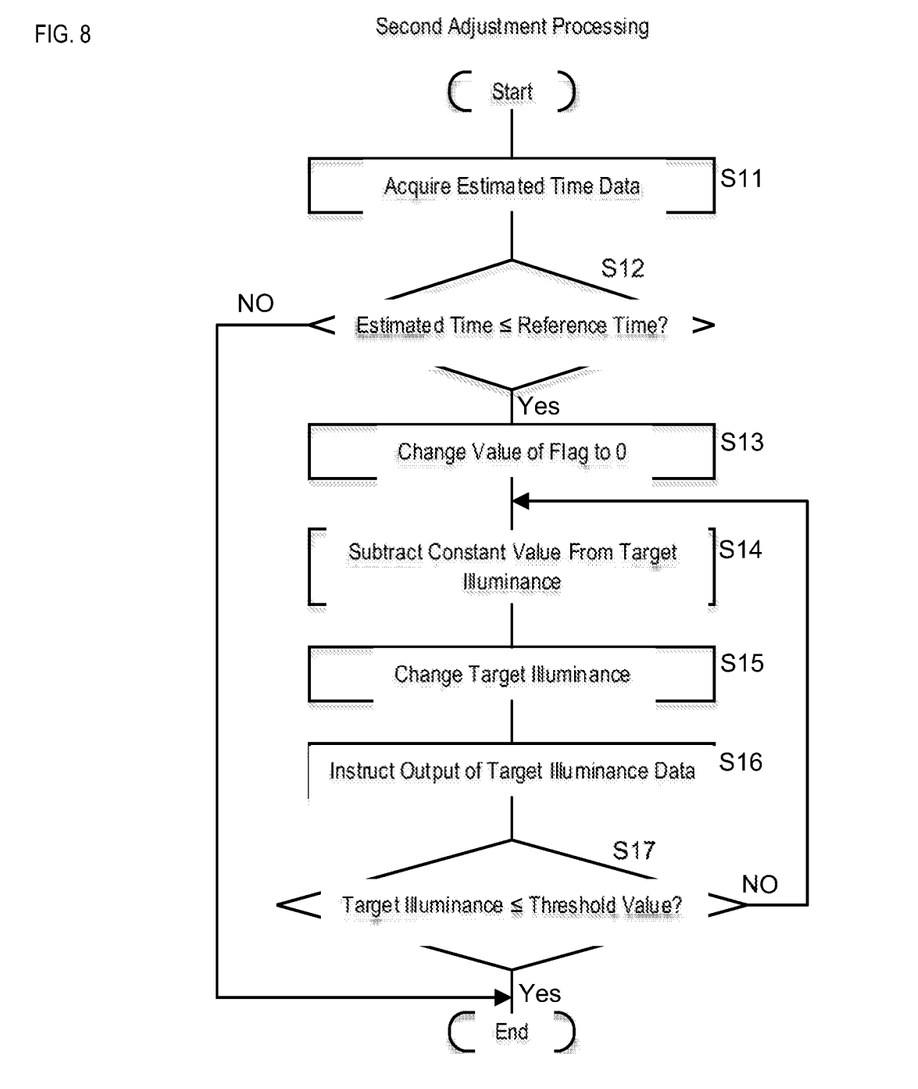
FIG. 8 is a flowchart showing a procedure of second adjustment processing.

FIG. 8 is a flowchart showing a procedure of second adjustment processing. The control unit 35 periodically executes the second adjustment processing if the value of the flag is 1, that is, if automatic driving is being performed. The control unit 35 executes the first adjustment processing and the second adjustment processing in parallel. As described above, if automatic driving of the vehicle 100 is being performed, the automatic driving apparatus 10 periodically outputs the estimated time data indicating the estimated time that it is estimated to take until automatic driving ends, to the input unit 30 of the microcomputer 23.

In the second adjustment processing, first, the control unit 35 acquires the estimated time data from the input unit 30 (step S11), and determines whether or not the estimated time indicated by the acquired estimated time data is less than or equal to a reference time (step S12). The reference time is constant and is set in advance. The reference time is 5 minutes, 10 minutes, or the like. The control unit 35 functions as a determination unit.

If it is determined that the estimated time exceeds the reference time, that is, if it is determined that the time that it takes until the automatic driving of the vehicle 100 ends is long (S12: NO), the control unit 35 ends the second adjustment processing.

If it is determined that the estimated time is less than or equal to the reference time, that is, if it is determined that the time that it takes until the automatic driving of the vehicle 100 ends is short (S12: YES), the control unit 35 changes the value of the flag stored in the storage unit 34 to 0 (step S13). Accordingly, periodic execution of the first adjustment processing is stopped.

Next, the control unit 35 subtracts a constant value from the target illuminance indicated by the target illuminance data stored in the storage unit 34 (step S14). The constant value is constant and is set in advance. Next, the control unit 35 changes the target illuminance indicated by the target illuminance data stored in the storage unit 34 to the illuminance calculated in step S14 (step S15). Note that if the illuminance calculated in step S14 is a negative value, in step S15, the control unit 35 changes the target illuminance to 0 lux.

After step S15 is executed, the control unit 35 instructs the output unit 33 to output the target illuminance data (step S16). Accordingly, the output unit 33 reads out the target illuminance data from the storage unit 34 and outputs the read-out target illuminance data to the drive unit 22. The drive unit 22 adjusts the illuminance of the interior light 12 to the illuminance calculated in step S14 and the illuminance of the interior light 12 decreases.

Instructing the output unit 33 to output the target illuminance data in step S16 corresponds to instructing the drive unit 22 to reduce the illuminance of the interior light 12.

After step S16 is executed, the control unit 35 determines whether or not the target illuminance indicated by the target illuminance data stored in the storage unit 34 is less than or equal to a threshold value (step S17). The threshold value is also constant and is set in advance. If it is determined that the target illuminance exceeds the threshold value (S17: NO), the control unit 35 executes step S14. Accordingly, the target illuminance further decreases by the constant value, and the drive unit 22 reduces the illuminance of the interior light 12 by the constant value. The control unit 35 reduces the target illuminance by the constant value until the target illuminance is less than or equal to the threshold value, and the drive unit 22 reduces the illuminance of the interior light 12 in a stepwise manner. The threshold value is 0 lux, or a sufficiently low positive value.

If it is determined that the target illuminance is less than or equal to the threshold value (S17: YES), the control unit 35 ends the second adjustment processing. If it is determined by the control unit 35 that the target illuminance is less than or equal to the threshold value and the second adjustment processing has ended, the value of the flag is 0, and therefore the periodic execution of the second adjustment processing stops.

As described above, with the illuminance adjusting apparatus 11, if the estimated time that it is estimated to take until the automatic driving of the vehicle 100 ends is less than or equal to the reference time, the drive unit 22 reduces the illuminance of the interior light 12, and thus visibility for a person looking out of the vehicle 100 from the interior is improved. Accordingly, the automatic driving ends in a state in which the visibility is high. Thereafter, if driving of the vehicle 100 is needed, the driver performs manual driving of the vehicle 100. At this time, the visibility for the occupants is high, and therefore the driver can perform appropriate manual driving.

Also, if the estimated time is less than or equal to the reference time, the drive unit 22 reduces the illuminance of the interior light 12 in a stepwise manner. For this reason, the visibility for the person in the interior gradually increases. As a result, the eyes of the occupants easily adjust to the illuminance outside of the vehicle 100.

Furthermore, if automatic driving is being performed, the illuminance of the interior light 12 is adjusted based on the rotation angles of the front-left seat 4f and the front-right seat 4r. For this reason, the illuminance of the interior light 12 is adjusted to a suitable illuminance.

Also, if automatic driving is being performed, the illuminance of the interior light 12 is adjusted to an illuminance based not only on the rotation angles of the front-left seat 4f and the front-right seat 4r, but also on the outside illuminance. For this reason, the illuminance of the interior light 12 is adjusted to a more suitable illuminance.

Note that if automatic driving of the vehicle 100 is being performed, the automatic driving apparatus 10 may also receive a switching instruction instructing switching to manual driving from an occupant of the vehicle 100. In this case, for example, the automatic driving apparatus 10 stops operation upon the elapse of a second reference time from when switching data indicating switching to manual driving is output to the input unit 30 of the microcomputer 23. When the switching data is input to the input unit 30, the control unit 35 of the microcomputer 23 causes the target illuminance data stored in the storage unit 34 to reduce the target illuminance, instructs the output unit 33 to output the target illuminance data, and causes the drive unit 22 to reduce the illuminance of the interior light 12 in a stepwise manner, similarly to the second adjustment processing. After the switching data is input, the control unit 35 reduces the target illuminance to an illuminance that is less than or equal to a threshold value until a second reference time elapses. The second reference time is constant and is set in advance.

A situation in which the automatic driving apparatus 10 is performing erroneous driving is conceivable as a situation in which an occupant instructs switching to manual driving. In this case, it is preferable that the time that it takes to switch from automatic driving to manual driving is short. For this reason, if the automatic driving apparatus 10 receives an instruction to switch to manual driving, the drive unit may also reduce the illuminance of the interior light 12 at a rate higher than the rate at which the drive unit 22 reduces the illuminance of the interior light 12 in the second adjustment processing.

With the illuminance adjusting apparatus 11, the configuration for reducing the illuminance of the interior light 12 is not limited to the configuration in which the target illuminance indicated by the target illuminance data that is repeatedly output by the output unit 33 is reduced in a stepwise manner. It is also possible to include a configuration in which the drive unit 22 reduces the illuminance of the interior light 12 in a stepwise manner. In this case, the control unit 35 outputs data instructing stepwise reduction of the illumination of the interior light 12 to the output unit 33, and the drive unit 22 reduces the illuminance of the interior light 12 in a stepwise manner when input of the data is received from the output unit 33.

The targets whose rotation angles are detected by the rotation angle detection unit 20 are not limited to the front-left seat 4f and the front-right seat 4r. For example, if the rear-left seat 5f and the rear-right seat 5r are installed so as to be able to rotate, the targets whose rotation angles are detected by the rotation angle detection unit 20 may also be such that the rotation angles of the front-left seat 4f, the front-right seat 4r, the rear-left seat 5f, and the rear-right seat 5r are detected. In this case, the illuminance of the interior light 12 is adjusted based on the four rotation angles detected by the rotation angle detection unit 20.

Furthermore, the number of seats installed in the vehicle 100 is not limited to four, and may also be one, two, three, five, or more. Also, the number of targets whose rotation angles are detected by the rotation angle detection unit 20 is not limited to two, and may also be one, three, or more. In this case, the illuminance of the interior light 12 is adjusted based on one or multiple rotation angles detected by the rotation angle detection unit 20.

Also, the configuration for setting the multiplier coefficient is not limited to the configuration in which the multiplier coefficient is set based on the correspondence table shown in FIG. 5, and may also be a configuration in which a formula is used in which one or multiple rotation angles detected by the rotation angle detection unit 20 and a coefficient are variables. With this configuration, the coefficient is calculated by substituting the one or multiple rotation angles detected by the rotation angle detection unit 20 into the formula, and the multiplier coefficient is set to the calculated coefficient.

The disclosed embodiments are in all respects exemplary, and are to be considered non-limiting. The scope of the present disclosure is indicated not by the above-described meaning but by the claims, and all changes that fall within the meaning and range of equivalency of the claims are intended to be encompassed therein.

The invention claimed is:

1. An illuminance adjusting apparatus comprising:
a determination unit configured to, if automatic driving of a vehicle in which a rotatable seat is installed is being performed, determine whether or not an estimated time that it is estimated to take until the automatic driving ends is less than or equal to a predetermined time;
an adjusting unit configured to reduce illuminance of an interior light for illuminating an interior of the vehicle, if it is determined by the determination unit that the estimated time is less than or equal to the predetermined time; and
a rotation angle detection unit configured to detect a rotation angle of the rotatable seat,
wherein if the automatic driving is being performed, the adjusting unit adjusts the illuminance of the interior light based on the rotation angle detected by the rotation angle detection unit.

2. The illuminance adjusting apparatus according to claim 1, wherein if it is determined by the determination unit that the estimated time is less than or equal to the predetermined time, the adjusting unit reduces the illuminance of the interior light in a stepwise manner.

3. The illuminance adjusting apparatus according to claim 1, comprising:
an illuminance detection unit configured to detect an illuminance outside of the vehicle,
wherein if the automatic driving is being performed, the adjusting unit adjusts the illuminance of the interior light based on the rotation angle detected by the rotation angle detection unit and the illuminance detected by the illuminance detection unit.

4. The illuminance adjusting apparatus according to claim 3, wherein the adjusting unit sets an illuminance based on the illuminance detected by the illuminance detection unit, and adjusts the illuminance of the interior light based on the rotation angle detected by the rotation angle detection unit, in a range of being less than or equal to the set illuminance.

5. An illuminance adjusting method comprising:
a step of determining, if automatic driving of a vehicle in which a rotatable seat is installed is being performed, whether or not an estimated time that it is estimated to take until the automatic driving ends is less than or equal to a predetermined time;
a step of reducing illuminance of an interior light for illuminating an interior of the vehicle, if it is determined that the estimated time is less than or equal to the predetermined time; and
a step of detecting a rotation angle of the rotatable seat,
wherein in the step of reducing the illuminance of the interior light,
if the automatic driving is being performed, the illuminance of the interior light is adjusted based on the detected rotation angle.

6. A computer program product comprising a non-volatile, machine-readable medium storing instructions which, when executed by at least one programmable processor, causes the at least one programmable processor to execute the following steps:
a step of determining, if automatic driving of a vehicle in which a rotatable seat is installed is being performed, whether or not an estimated time that it is estimated to take until the automatic driving ends is less than or equal to a predetermined time;
a step of instructing reducing illuminance of an interior light for illuminating an interior of the vehicle, if it is determined that the estimated time is less than or equal to the predetermined time; and
a step of detecting a rotation angle of the rotatable seat,
wherein in the step of reducing the illuminance of the interior light,
if the automatic driving is being performed, the illuminance of the interior light is adjusted based on the detected rotation angle.

7. The illuminance adjusting apparatus according to claim 2, comprising:
an illuminance detection unit configured to detect an illuminance outside of the vehicle,
wherein if the automatic driving is being performed, the adjusting unit adjusts the illuminance of the interior light based on the rotation angle detected by the rotation angle detection unit and the illuminance detected by the illuminance detection unit.

* * * * *